United States Patent [19]
Mannion

[11] Patent Number: 5,911,399
[45] Date of Patent: Jun. 15, 1999

[54] VEHICLE ANCHORED SUPPORT

[76] Inventor: Robert A. Mannion, 71555 Jaguar Way, Palm Desert, Calif. 92260

[21] Appl. No.: 09/028,995

[22] Filed: Feb. 25, 1998

[51] Int. Cl.$^6$ ..................................................... F16M 13/00
[52] U.S. Cl. ........................................ 248/514; 135/88.06
[58] Field of Search .................................... 248/156, 514, 248/519, 523, 528, 529; 135/16, 88.06, 99

[56] References Cited

U.S. PATENT DOCUMENTS

| | | | |
|---|---|---|---|
| 2,441,109 | 5/1948 | Carlson | 403/86 |
| 4,150,506 | 4/1979 | McGinnis et al. | 248/523 |
| 4,591,126 | 5/1986 | Berney | 248/524 |
| 4,655,236 | 4/1987 | Dorame et al. | 135/88.06 |
| 5,158,103 | 10/1992 | Leu | 135/88.06 |
| 5,169,111 | 12/1992 | Dunaj | 248/523 |
| 5,207,406 | 5/1993 | Stine et al. | 248/514 |
| 5,241,977 | 9/1993 | Flores et al. | 135/88.06 |
| 5,295,500 | 3/1994 | Leu | 135/88.06 |
| 5,354,031 | 10/1994 | Bilotti | 248/519 |
| 5,458,306 | 10/1995 | O'Farrill et al. | 248/514 |
| 5,588,630 | 12/1996 | Chen-Chao | 248/514 |
| 5,601,104 | 2/1997 | Perkins | 135/88.06 |
| 5,685,517 | 11/1997 | Salibra | 248/519 |

FOREIGN PATENT DOCUMENTS

| | | |
|---|---|---|
| 649380 | 12/1928 | France . |
| 815768 | 7/1937 | France . |
| 548005 | 4/1932 | Germany . |

Primary Examiner—Ramon O. Ramirez
Assistant Examiner—Robert Lipcsik
Attorney, Agent, or Firm—Richard C. Litman

[57] ABSTRACT

A vehicle anchored support includes a base plate having an anchor portion configured for removable placement beneath a vehicle tire for securely anchoring the device, and an article support portion extending laterally outwardly from the anchor portion. The article support portion is preferably formed as a box-like structure for strength and durability, and provides for an article support column or the like extending therefrom. Preferably, the article support column is removably attached to the base portion by a socket or receptacle formed within the article support portion, for compact storage of the device. The column may be adjustably secured to the base portion of the device, as desired. The article support column may be relatively tall, for the support of an umbrella or other overhead article thereby, or may be configured to support a work station or the like. The anchor portion of the base plate may include non-skid traction enhancements on the upper and/or lower surfaces thereof, as desired. The present vehicle anchored support provides an extremely sturdy and stable support for any number of articles due to the weight of the vehicle and vehicle tire capturing the anchor portion between the tire and the underlying surface, and is useful in providing a work station for persons performing work or repairs in the field, and/or in providing support for various articles used by campers and the like, such as umbrellas, hammocks, tables and seats, etc., as desired.

10 Claims, 6 Drawing Sheets

VEHICLE ANCHORED SUPPORT

BACKGROUND OF THE INVENTION

1. Field of the Invention

The present invention relates generally to supports, brackets, and the like for supporting, holding, or suspending articles thereby, and more specifically to a vehicle anchored support in which a portion of the support is anchored beneath the tire of a vehicle (car, truck, trailer, etc.). The support includes a base with a column extending generally upwardly therefrom, with the column being used to support or suspend various articles therefrom, for the convenience and use of the vehicle operator and/or users.

2. Description of the Related Art

Numerous accessories have been developed for use with automobiles and other motor vehicles over the years, practically since the development of the earliest such motor vehicles. Attachments ranging from luggage and ski racks, pickup truck bed racks, camper shells, motor home and trailer awnings, etc., are well known in the motor vehicle art. While each of the above articles can be of great utility to a user thereof, they nevertheless in each case require some modification or attachment to the vehicle, thus affecting the utility of the vehicle for other purposes.

An example of the above is the roof mounted luggage rack, which requires modification of the vehicle for permanently installed units, and which affects the vertical clearance of the vehicle, particularly in the case of taller vans and the like. While such roof racks undeniably increase the capabilities of the vehicle in certain respects, they are nevertheless limited in their function. The very aspect of their roof mounting, means that they cannot be used to anchor or support other articles lower than the roof of the vehicle, without additional attachments thereto.

While camper shells and trailers provide additional carriage and storage capacity for vehicles to which they are attached, they also require modification of the vehicle for installation thereto, at least by installing a trailer hitch on the vehicle. In any event, such accessories cannot be added to all vehicles, due to the vehicle configuration, towing capacity, etc.

It will be noted that in each of the above cases, the various accessories described, mount directly to the vehicle (e.g., trailer hitch) and are not supported, anchored, or attached in any other way. Those who camp with their vehicles, or use them in support of their work for performing various jobs at remote sites, must not only carry the various articles and accessories required, but must also carry the support means required for those articles. Thus, a camper who wishes to have shade, must not only carry the parasol or umbrella, but must also carry appropriate anchor means for the device. If other accessories are desired (e.g., hammock, table, etc.), then additional supports must be carried for these articles.

In each of the above cases, the various accessories are either supported by direct attachment to the vehicle itself, or by means of a completely separate stand, support, etc., which is driven into or supported on the ground, separate from the vehicle. Accordingly, a need will be seen for a vehicle supported anchor which uses the weight of a vehicle to capture or sandwich an anchor plate between a vehicle tire and the underlying surface while the vehicle is parked. The base component from which the anchor plate extends, provides for the attachment (either permanent or removable) of a support column thereto, with the column providing for the support of various articles therefrom. A discussion of the related art of which the present inventor is aware, and its differences and distinctions from the present invention, is provided below.

U.S. Pat. No. 2,441,109 issued on May 4, 1948 to Ernest J. Carlson, titled "Spiral Stake," describes a ground anchor for an umbrella or the like wherein the anchor has a screw thread which is penetratingly screwed into the ground. The disclosure includes means for adjusting the angle of a support column extending upwardly from the base or stake. While the present invention may be used to support an umbrella or the like, and may include angular adjustment means, it differs in that Carlson does not disclose any means of securing his stake by the weight of a vehicle. In fact, the Carlson stake teaches away from such means, due to the relatively sharp stake which would be inappropriate to place beneath the tire of a vehicle, as in the present invention.

U.S. Pat. No. 4,591,126 issued on May 27, 1986 to Sheldon Berney, titled "Base For Supporting An Upright Post Of A Garden Umbrella Or The Like," describes a hollow container having a central receptacle therein, for the insertion of a post or the like therein. The container is filled with liquid to provide sufficient mass to anchor the post or column suitably, particularly against wind loads often encountered by umbrellas and parasols. However, the relatively small base portion cannot possibly hold a sufficient amount of ballast to approach the security of the present anchor when a vehicle tire is resting thereon. Also, the central location of the receptacle, as well as the height and thickness of the device, render it unsuitable for use beneath a vehicle tire, as provided by the structure of the present invention.

U.S. Pat. No. 5,169,111 issued on Dec. 8, 1992 to Raymond C. Dunaj, titled "Collapsible Stand For Shade Umbrellas," describes a collapsible bag for holding sand or other ballast, surrounding a sleeve through which the base of an umbrella stake is inserted. The device is more closely related to the device described in the Berney '126 U.S. Patent, than to the present device, and is completely unsuitable for being anchored beneath the tire of a vehicle, as provided by the present invention. Moreover, while the present invention provides for anchoring an umbrella therein, it will be seen in the present disclosure, that the present device is far more versatile and may be used to anchor or support various articles other than umbrellas, either singly or simultaneously as desired.

U.S. Pat. No. 5,207,406 issued on May 4, 1993 to Janice M. Stine et al., titled "Umbrella Stand," describes a base comprising a container which may be filled with ballast to serve as an anchor for an umbrella or the like. The base includes a pair of receptacles which provide for alternate generally vertical or angular mounting of an umbrella shaft or column therein. Accordingly, the Stine et al. device is more closely related to the ballasted supports of the Berney and Dunaj U.S. Patents discussed above, than to the present invention.

U.S. Pat. No. 5,354,031 issued on Oct. 11, 1994 to Alfred J. Bilotti, titled "Low-Profile Umbrella Base," describes a relatively wide and low base which is filled with sand, concrete or the like, with a central receptacle for holding an umbrella. Again, the present invention is not limited to use in holding umbrellas, and is configured to be anchored by the weight of a vehicle resting upon a plate extending therefrom, rather than by other ballast, as in the Bilotti device.

U.S. Pat. No. 5,588,630 issued on Dec. 31, 1996 to Huang Chen-Chao, titled "Adjustable Base To Hold Flag Banners,"

describes an angularly adjustable base having cooperating radially serrated components to lock the desired angle. The bottom portion includes holes for attachment bolts. No extending base or flange is provided for placement beneath a vehicle tire for anchoring the assembly, as provided by the present invention, and the radially serrated locking means is not sufficiently secure for the purposes of the present invention.

U.S. Pat. No. 5,685,517 issued on Nov. 11, 1997 to Joseph Salibra, titled "Stand For Removably Mounting Pole Supported Furniture To A Deck," describes a base which is secured to a deck by a pair of eye bolts passing through the gaps in the deck boards to extend through a pair of holes in the base. The round ends of the eye bolts are positioned beneath the deck boards, with the deck boards being sandwiched between the eye ends of the bolts and the base of the stand. No means is described for removably securing the device beneath a vehicle tire, to anchor the device in place.

French Patent Publication No. 649,380 published on Dec. 21, 1928 illustrates a spike which may be secured in the ground to anchor an angularly adjustable umbrella or the like. The device teaches away from the present invention in the manner of the stake disclosed in the Carlson '109 U.S. Patent, in that a sharp object would not be placed beneath a vehicle tire for anchorage.

German Patent Publication No. 548,005 published on Apr. 11, 1932 illustrates a spiked umbrella anchor with a telescoping column. As noted above in the discussion of the Carlson U.S. Patent and French '380 Patent Publication, such a sharp anchor would not be suitable for placement beneath a vehicle tire.

Finally, French Patent Publication No. 815,768 published on Jul. 22, 1937 illustrates a four legged, angularly adjustable column. No means of anchoring the base of the column beneath another article, particularly a vehicle tire, is apparent.

None of the above inventions and patents, either singly or in combination, is seen to describe the instant invention as claimed.

SUMMARY OF THE INVENTION

The present invention comprises a vehicle anchored support, in which a base plate has a generally flat anchor portion for placing beneath a vehicle tire and for anchoring the device thereby, and an article support portion extending laterally outwardly from the anchor portion for holding an article thereby. The device may include some form of non-skid or friction enhancing means on the upper and/or lower surface(s) of the anchor portion, to provide greater security and to provide traction for the vehicle when needed. The article support portion may comprise a box-like structure for strength and rigidity, with a socket disposed generally vertically therethrough for the installation of a support column or the like therein. The box structure may be used for parts storage when the device is not in use.

Preferably, the column is removably and adjustably installable in the socket, for compact storage of the device and for positioning the column as desired, depending upon the article(s) being supported by the column. The column may have a maximum height configured for supporting a work station (table and tools, etc.) at an appropriate height, or may extend further upwardly for supporting an umbrella, upper shelves or supports, etc., as desired. Adjustment means may be provided for adjusting the angle of the work station or table supported thereby, depending upon the angle of the column from the vertical. The column may include telescoping or other means for compact storage, and/or other angular adjustment means, as desired.

Accordingly, it is a principal object of the invention to provide an improved vehicle anchored support for holding or supporting various articles by means of the weight of a vehicle and its tire resting upon an anchor base, to secure the support.

It is another object of the invention to provide an improved vehicle anchored support including a base plate having an anchor portion for removable placement beneath a vehicle tire, and an article support portion for holding or supporting an article support therefrom.

It is a further object of the invention to provide an improved vehicle anchored support, which base plate may include traction increasing means thereon and which article support portion may include storage means therein.

An additional object of the invention is to provide an improved vehicle anchored support providing for angular adjustment of the attachment of a support column thereto.

Still another object of the invention is to provide an improved vehicle anchored support providing for the support of various articles at various heights above the surface, as desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a vehicle anchored support, having an anchor portion which is captured or anchored beneath the tire of a stationary vehicle, and an article support portion which extends laterally outwardly therefrom for holding an article or article support column securely.

Figure 1:
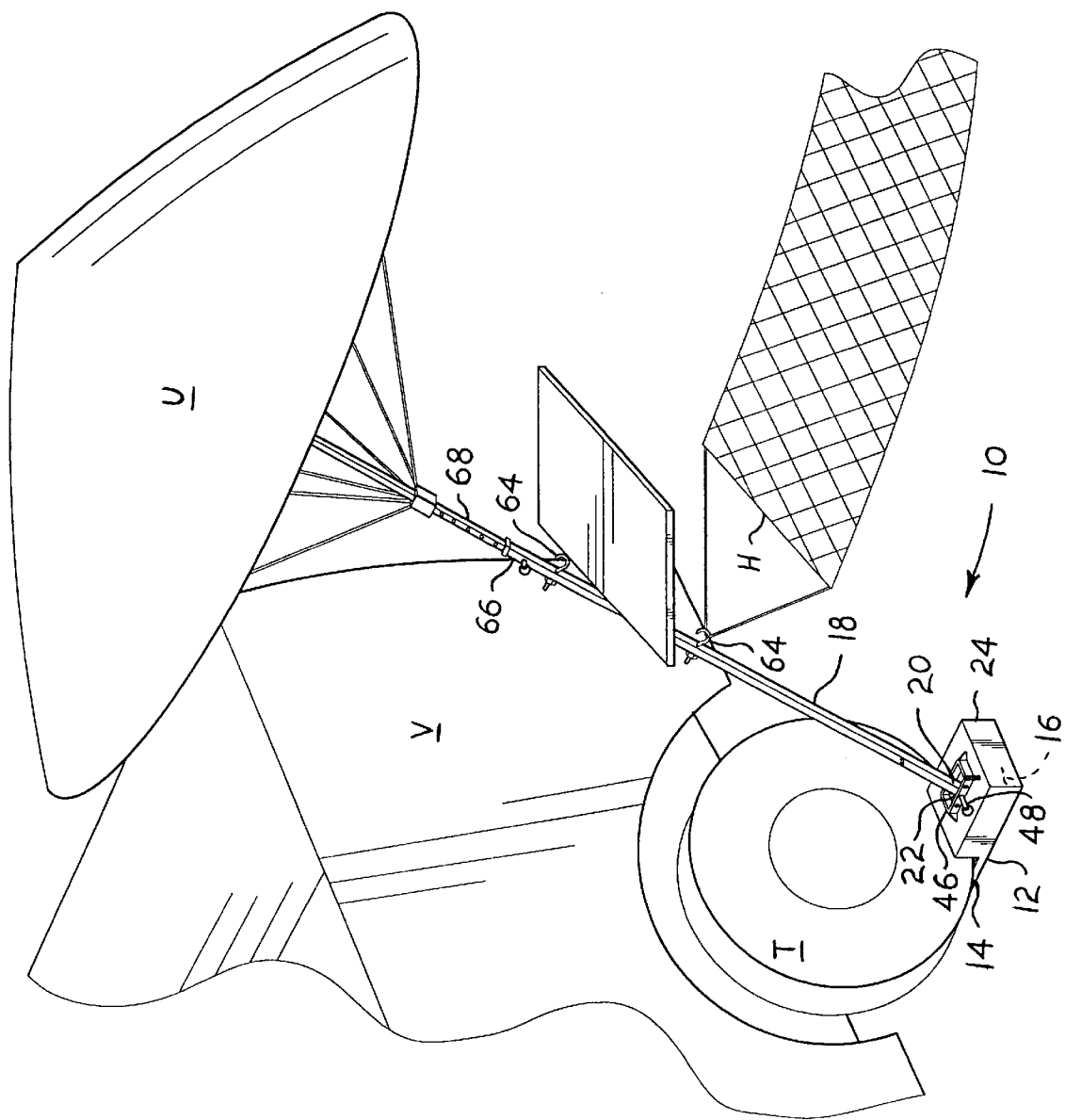
FIG. 1 is an environmental perspective view of the present vehicle anchored support in use, showing its anchored position and support of various articles thereby.
Figure 2:
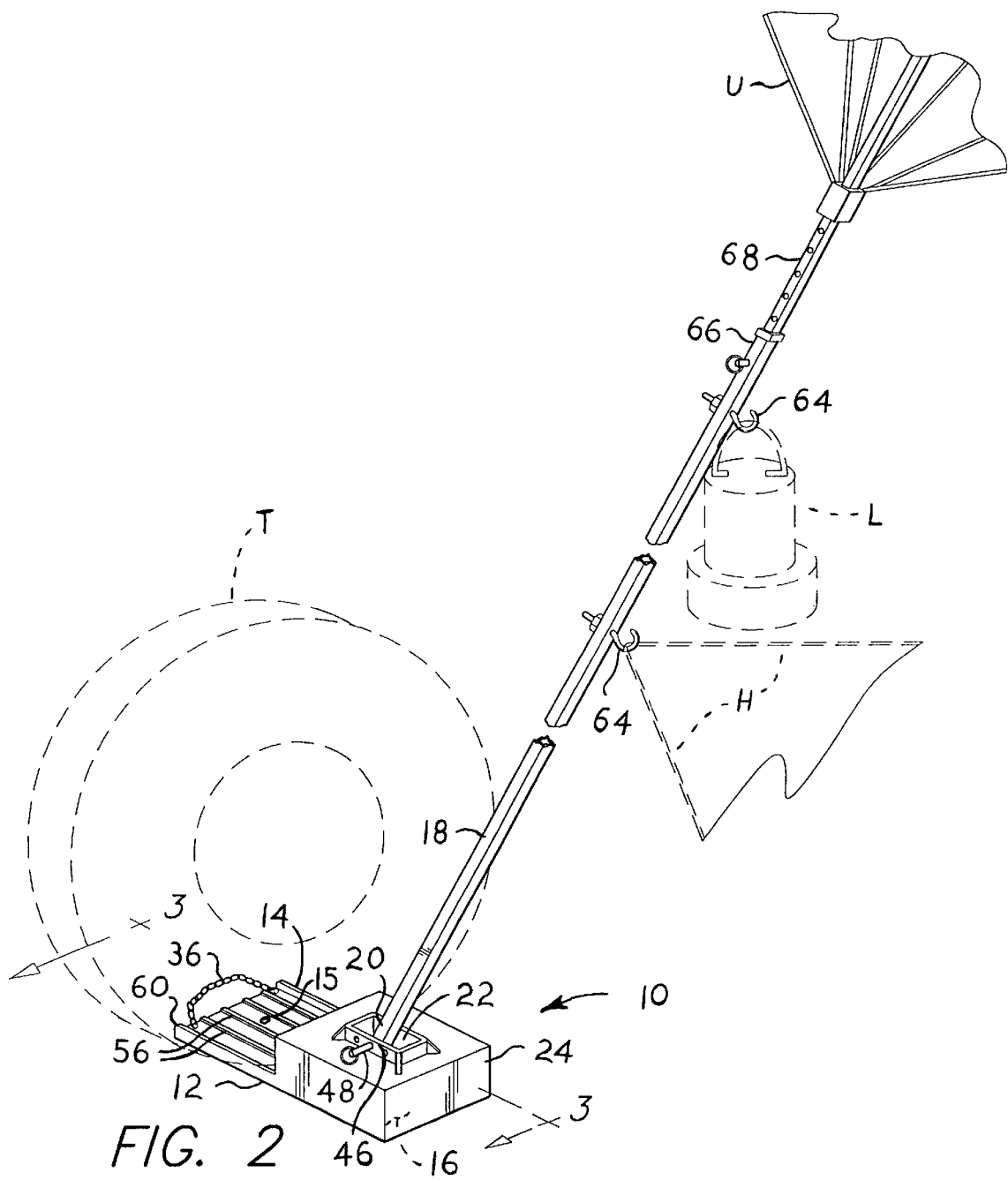
FIG. 2 is a partially broken perspective view similar to the view of FIG. 1, showing further details of the present invention.

FIGS. 1 and 2 provide perspective views of the present vehicle anchored support, designated generally by the reference numeral 10 in the various views. The support 10 includes a base plate 12, formed of a single rigid sheet of metal. The base plate 12 has an anchor portion 14, which is disposed inwardly relative to the vehicle V with which the present device is used, and sandwiched between the stationary vehicle tire T and the underlying surface when the present support 10 is in use. One or more anchor holes 15 may be provided through the anchor portion 14 of the base plate 12, to provide for alternative anchoring of the support 10 by means of a pin, bolt, rod, etc. (not shown) which may be driven into the ground or attached to another article, through the anchor hole(s) 15 to secure the support 10 to the ground or other article in lieu of anchoring it by means of a vehicle tire.

The opposite end of the base plate 12 comprises an article support portion 16, which extends laterally outwardly from the anchor portion 14 relative to the vehicle V when the device is in use. Thus, the weight of several hundred pounds, or perhaps a thousand pounds or more, resting atop the anchor portion 14, also serves to secure the article support portion 16 due to the rigidity and monolithic nature of the base plate 12, when the anchor portion 14 of the device is secured beneath the tire T of a stationary vehicle V.

The article support portion 16 includes some means for supporting an article therefrom, such as an article support column 18 which is removably or permanently secured to the article support portion 16 of the device. Preferably, the support column 18 has a lower or anchor attachment end 20 (FIG. 3), used to secure the column 18 in place in a receptacle 22 of the article support portion 16, discussed in detail further below. The structure of the column 18 is not critical, so long as it is sufficiently sturdy and rigid to provide support for various loads which may be supported or suspended thereby, as described further below.

Figure 3:
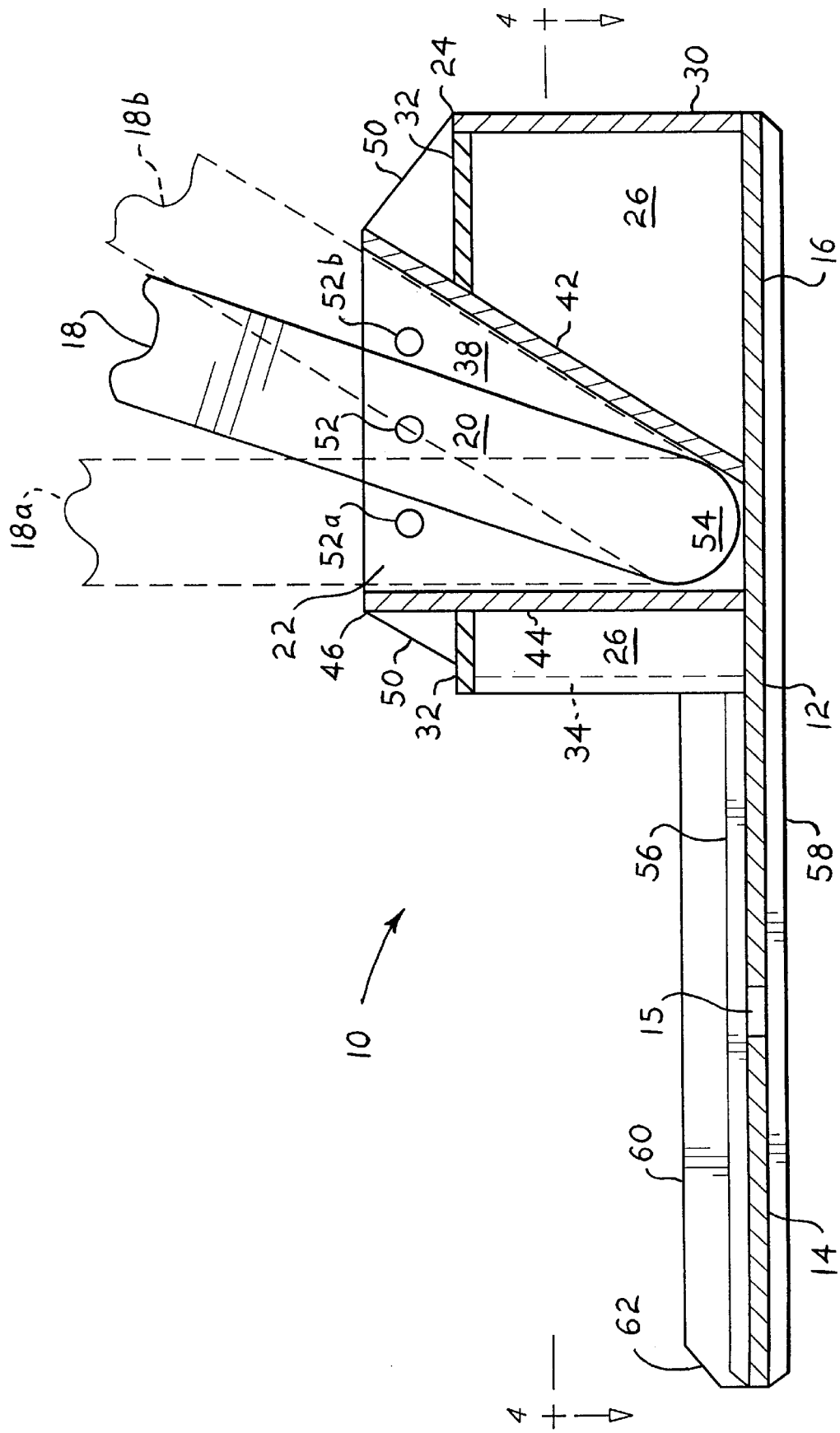
FIG. 3 is an elevation view in section along line 3—3 of FIG. 2, showing various structural details of the present vehicle anchored support.
Figure 4:
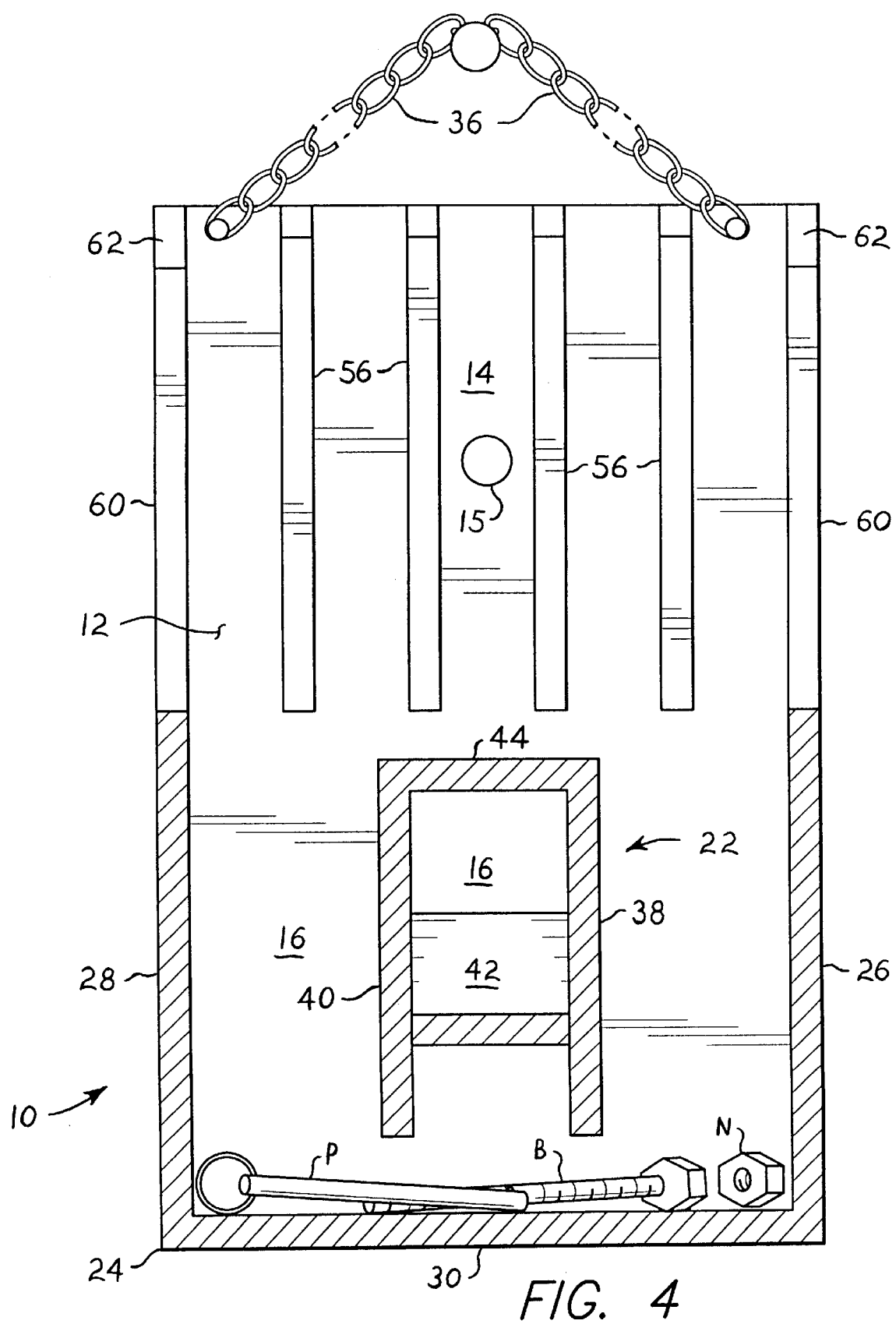
FIG. 4 is a top plan view in section along line 4—4 of FIG. 3, showing further structural details.

Preferably, the article support portion 16 of the base plate 12, includes a column support structure 24 extending generally upwardly therefrom, shown in detail in FIGS. 3 and 4. This structure 24 may comprise a generally rectangular box-like structure, having a bottom defined by the article support portion 16 of the base plate 12, opposite first and second sides 26 and 28, an end plate or side 30, and a generally closed top 32. One of the sides of the column support structure 24, e.g., the side facing the anchor portion 14 of the base plate 12, may be left open for storage and access of small parts (e.g., bolts B, nuts N, pip pins P, etc.), which might be used in the attachment of the column 18 to the remainder of the support device. Alternatively, the side facing the anchor portion 14 of the base plate 12 be provided with a closure 34, shown in broken lines in FIG. 3. A handle means 36, i.e., padded or unpadded chain, rope, strap, etc., may be provided at one end of the device for hanging the device during storage.

The column support structure 24 includes the article support column receptacle 22 for receiving the lower or anchor attachment end 20 of the column 18. The receptacle or socket 22 is preferably constructed in the general center of the column support structure 24, and includes a first and opposite second side, respectively 38 and 40 and a first and opposite second end, respectively 42 and 44. It will be noted that the first end 42 is sloped downwardly toward the opposite second end 44, in order to capture the bottom end of the article support column 18 securely therein, regardless of the angle at which the column 18 is secured within the receptacle 22. The bottom of the receptacle or socket 22 is formed by the continuous span of the article support portion 16 of the base portion 12, while the top is open by means of a passage through the otherwise closed top portion 32 of the larger column support structure 24 surrounding the receptacle 22.

It will be noted in FIGS. 1 through 3, that the article support column receptacle 22 extends upwardly past the top surface 32 of the surrounding column receptacle support structure 24. This upward extension 46 serves at least two purposes: (1) it provides access to a locking pin or bolt 48 (FIGS. 1 and 2) which is used to secure the lower end 20 of the article support column in place in the receptacle 22, and (2) it provides additional height and therefore leverage and strength for the article support column receptacle 22. Additional reinforcement webs 50 may be provided at the upper corners and/or elsewhere about the top of the receptacle 22, as desired.

The upper portions of the two opposite sides 38 and 40 of the receptacle 22 each include a corresponding series of holes, e. g., holes 52, 52a, and 52b, therethrough, for accepting the locking pin 48 to secure the lower end 20 of the article support column 18 at the desired angle. The holes 52 are preferably located to position the article support column 18 at a predetermined angle, depending upon which hole 52 through 52b is used to secure the lower end 20 of the column 18. In FIG. 3, the first hole 52a secures the column (shown as column 18a, in broken lines) generally vertically relative to the base plate 12, while the second or central hole 52 secures the column 18 (shown in solid lines) at an angle of about 15 degrees from the vertical. The third hole 52b is used to secure the column (shown as column 18b, in broken lines) at an angle of about 25 degrees from the vertical. Other hole positions may be provided as desired, to provide other angles for the column 18.

Preferably, the bottom tip or end 54 of the article support column 18 is rounded, in order to roll smoothly in the bottom of the support column receptacle 22 when angular adjustment is made to the column 18. As-the first end 42 of the column receptacle 22 is sloped downwardly toward the opposite second end 44, the rounded bottom end 54 of the article support column 18 is captured closely between the lower portions of the first and second ends 42 and 44 of the receptacle 22. Thus, the precise angle of the column 18 is defined by the captured base end 54 and the adjustment hole 52, 52a, or 52b used to secure the anchor attachment end 20 of the column 18, precluding any angular rocking or movement of the column.

Preferably, at least the base plate 12, and more preferably the entire structure comprising base plate 12, receptacle 22, and receptacle support structure 24, are formed of a relatively heavy gauge of steel, for strength and durability. (Other materials, such as aluminum or even a high strength plastic, etc., might be used alternatively, if so desired.) Such materials do not provide a particularly high coefficient of friction, thus making it possible that the vehicle might slip when a drive wheel is being driven onto the anchor portion 14 of the base plate 12, or that the drive wheel may kick the device out from under the wheel during such a maneuver. Accordingly, some traction enhancing means, such as the series of ribs or ridges 56 disposed across the upper surface of the anchor portion 14 and normal to the direction of travel of the wheel, may be provided. Similar traction enhancing means 58 may be provided on the bottom of the anchor portion 14 also.

Additional utility is provided by raised wheel chock flanges 60, along the forward and rearward edges of the anchor portion 14 of the device. These upwardly extended flanges 60 are sufficiently low that a vehicle tire T will roll over them when a relatively small amount of motive power is applied to the vehicle V, but will serve to prevent the vehicle V from rolling once the vehicle has been parked with a tire T atop the anchor portion 14 of the device, as shown in FIGS. 1 and 2. Preferably, the outermost corners 62 of at least the wheel chock flanges 60, and optionally the upper traction ribs or ridges 56, are beveled or chamfered in order to preclude any sharp edges which might cut or damage a tire.

The flanges 60 also serve an additional purpose, by precluding the swiveling or turning of the device when other than a purely lateral load is placed thereon. It will be seen that a force angled to the front or rear of the vehicle, rather than a purely lateral load, will impose a torque on the base plate 12 due to the distance between the column receptacle 22 and the center of the anchor portion 14 of the plate 12. If a sufficient force is developed, this may cause the entire base plate, and thus the entire support 10, to pivot or swivel beneath the vehicle tire T, depending upon the nature of the underlying surface. (Concrete, with its relatively low coefficient of friction and hardness precluding the "digging in" of the base plate 12 and/or traction means or cleats 58, is an excellent example.) The raised flanges 60, which engage the overlying tire tread to some extent when the device 10 is properly positioned, resist any turning or pivoting action due to the additional grip provided between the flanges 60 and the overlying tire, thus precluding, or at least substantially reducing, any tendency for the anchor device 10 to pivot when other than a purely lateral load or force is imposed thereon.

The traction enhancing means 56 and 58 and raised wheel chock flanges 60 provide further use for the present anchor device 10, allowing its use as a traction aid for a vehicle which is stuck in mud, snow, or other low friction surface. The vehicle operator need only place the anchor portion 14 of the device 10 immediately in front of (or behind, depending upon the desired direction of travel) the slipping drive wheel, and use the traction provided by the device 10 to move the vehicle. Oftentimes, a matter of a foot or so of horizontal movement of the vehicle, is sufficient for the vehicle to reach an area where sufficient traction is found to proceed normally. Such traction enhancing means 56 and 58 need not be in the form of the lateral ribs shown in the drawings, but may have any practicable form, such as a diamond pattern, a knobby texture, or even spikes extending downwardly from the bottom of the anchor portion 14 to extend into the underlying surface.

As noted further above, the article support column 18 may be used to support any one of a number of different articles therefrom. Preferably, the support column 18 is formed of a length of relatively heavy wall steel tube of any suitable cross section (square, round, rectangular, etc.), in order to provide sufficient bending strength when lateral loads are placed thereon. For example, the article support column 18 may include one or more article attachment means 64 (hooks, etc., FIGS. 1 and 2) disposed at a predetermined height, for securing a hammock H (FIGS. 1 and 2), lantern L (FIG. 2), or other article thereto. The upper end 66 of the support column 18 could be fitted with an adjustable, axially extendible portion 68, thereby allowing the height of an umbrella U (FIGS. 1 and 2), or other relatively elevated accessory to be supported or suspended by the support column 18.

Figure 6:
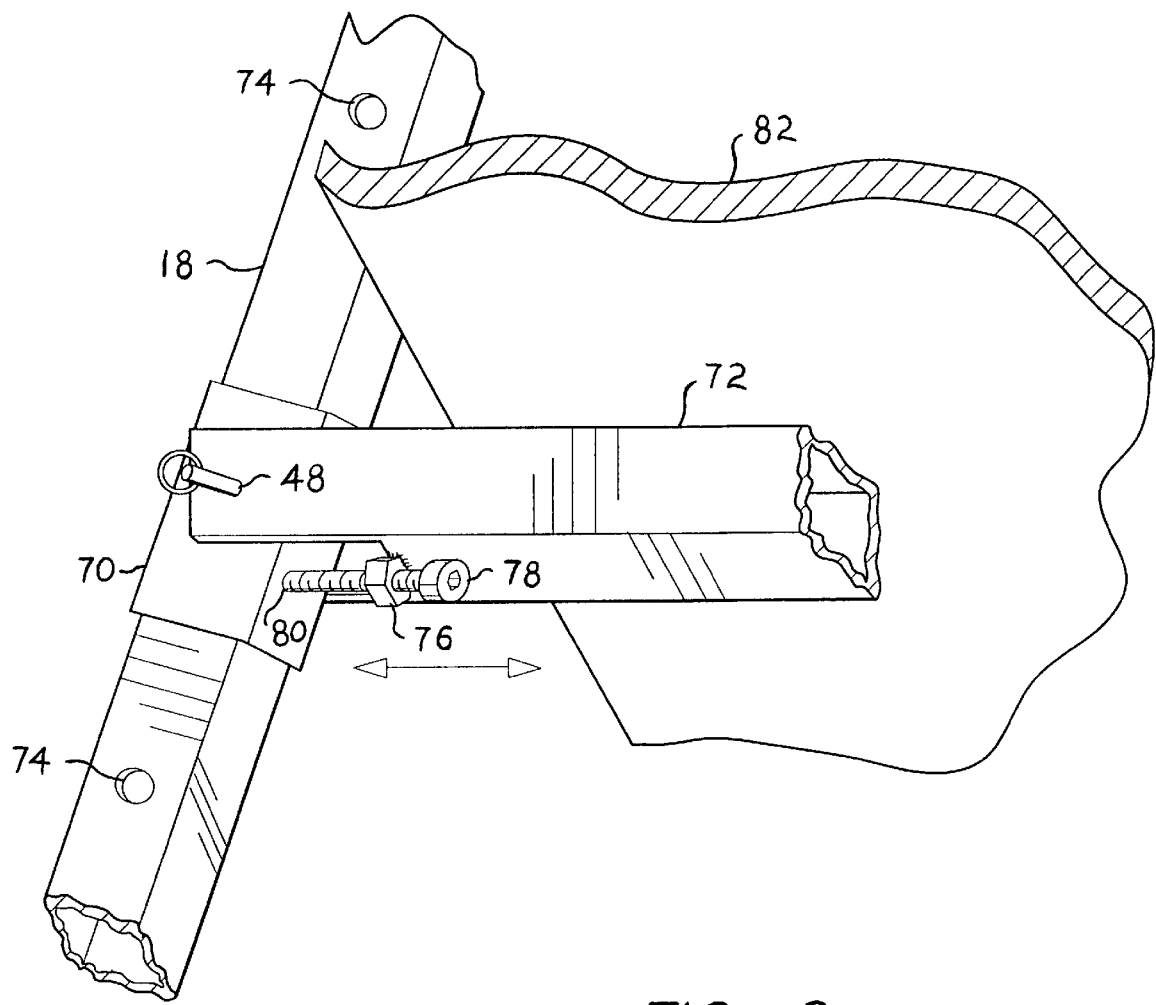
FIG. 6 is a broken away perspective view of an alternative work station and support, adjustably installed on a longer column than that shown in FIG. 5.

In addition to the conveniences provided by the present vehicle anchored support 10 for recreational use, the present support 10 may include attachments for facilitating work projects at remote sites away from the shop, where the vehicle is available to provide anchorage for the support. FIG. 6 illustrates one such embodiment, where a mating sleeve 70 is positioned over the support column 18 to hold a work station arm 72 in a cantilever relationship therefrom.

A series of lateral holes 74 may be provided through the column 18 to allow height adjustment of the work station arm 72, with a pin 48 (similar to that used to secure the base of the support column 18 in the receptacle 22) being used to secure the sleeve 70 and arm 72 on the column 18.

It will be seen that the lateral pin means used to secure the work station arm 72 in place on the column 18, allows the work station arm 72 to pivot upwardly and downwardly about the pin 18, unless some other means is used to support the arm 72. Accordingly, an arm support is provided, comprising an internally threaded receiver 76 (nut, or other fitting) which is welded or otherwise securely attached to the work station arm 72 adjacent its attachment to the column 18. An externally threaded adjuster 78 is threaded through the adjustment receiver 76, with its distal end 80 bearing against the sleeve 70 (or column 18). Turning the adjuster 78 inwardly through the receiver 76, advances the distal end 80 to raise the work station arm 72, as desired. This allows the angle of the work station arm 72 (and any article attached thereto, such as the work table 82 shown in FIG. 6) to be adjusted as desired, to compensate for the angle of the column 18 as set by its adjustable installation in the receptacle 22, discussed in detail further above.

The above described work station attachment means for the column 18, allows such a work station to be placed at any predetermined elevation along the column 18, as desired. This works well for the removable installation of a chair or seat along the column 18, or a small table, etc., at any height as desired. However, it may be desired in some instances to have a relatively short work station support column, having a height particularly configured to serve as a work station support, e.g., extending on the order of thirty inches or so above the base receptacle 22.

Figure 5:
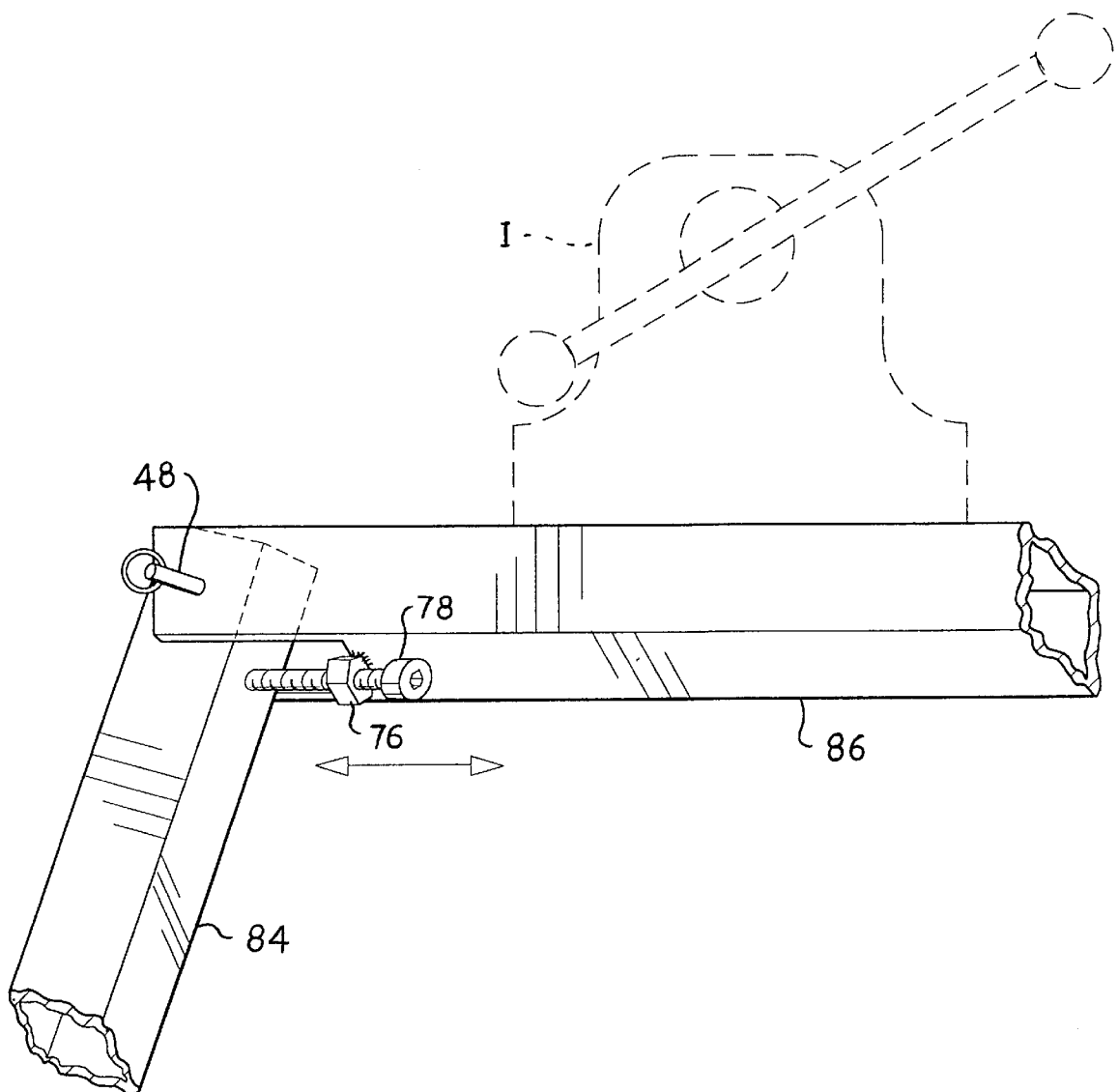
FIG. 5 is a broken away perspective view of the upper end of a work station support, and attachment and adjustment means for the work station.

Such a specifically configured work station column is shown in FIG. 5, and designated as column 84. The relatively shorter column 84, with its lack of vertical adjustment, may provide several advantages over a taller column 18 for such purposes, i.e., the lack of adjustment holes provide a stronger column, and the shorter column 84 is more easily stored when not in use. The general attachment of the work station arm 86 of FIG. 5 is essentially the same as that described above for the adjustable work station of FIG. 6, with a lock pin 48 being inserted through a lateral hole in the attachment end of the arm 86 and a mating hole through the upper end of the work station support column 84. Angular adjustment means for the arm 86 may be provided by a threaded receiver 76 secured to the arm 86 and a mating adjuster 78, in the manner shown and described for adjusting the level of the work station arm 72 of FIG. 6.

The present vehicle anchored support 10 is easily readied for use by positioning the base, comprising the base plate 12 with its anchor portion 14 and article support portion 16, immediately in front of or behind a vehicle tire T, after the vehicle has been maneuvered in a position as desired. The vehicle is then driven to place the previously adjacent tire atop the anchor portion 14 of the base plate 12, thereby firmly securing the anchor portion 14 (and the remainder of the base portion) between the vehicle tire and the underlying surface, with the weight of the vehicle supported by that tire, serving to hold the present vehicle anchored support solidly and immovably in place.

The article support column 18 (or work station support column 84) may then be installed in the base receptacle 22 at the desired angle, and any other accessories desired (hammock, umbrella, work table, etc.) suspended from the column 18 or 84. It will be seen that the work station arm may include or have attached thereto a work table, as in the arm 72 and table 82 of FIG. 6, or may alternatively have any one of a number of tools and equipment, such as the vise I shown in FIG. 5, or other powered or unpowered tools and equipment as desired, either temporarily or permanently secured thereto. When the work or recreational activity is over, any articles supported by or suspended from the support column 18 or 84 are removed, the support column 18 or 84 is removed from the base receptacle 22, and the vehicle is moved slightly to remove the weight of the vehicle from the anchor portion 14 of the device, whereupon the base portion may be picked up and stored as desired.

In summary, the present vehicle anchored support will be seen to provide broad utility for a number of purposes, for vehicle operators and users who have occasion to use various accessories in the vicinity of their vehicle, which accessories require anchoring in some form or another. The present invention will find great acceptance among recreational vehicle owners, who generally find need to erect umbrellas, hammocks, tables, additional seating, etc. outside their vehicles. Hobbyists of many types will also find the present vehicle anchored support to be of great value, for virtually any outdoor hobby where work must occasionally be performed on equipment (e.g., various levels of motor racing)

Workers and craftsmen who have need of their vehicles during the course of their work (e.g., contractors, electricians, plumbers, etc.) will also find the present vehicle anchored support to be of great value, whenever a temporary but sturdy work surface or tool mounting is required, e.g., pipe cutting and threading, electrical conduit work, etc. The relatively short work station column is easily stored in a conventional cross-bed storage box in a pickup truck, or even behind the seat or other relatively limited storage area. Thus, the present invention will prove to be of great value for a wide variety of vehicle users, ranging from recreational vehicle enthusiasts to hobbyists to contractors and other workers, with the present invention being capable of serving all of their needs relating to the sturdy support of a wide variety of tools, equipment, accessories, and other articles adjacent to a vehicle in the field.

It is to be understood that the present invention is not limited to the embodiments described above, but encompasses any and all embodiments within the scope of the following claims.

I claim:

1. A vehicle anchored support, comprising:
   a rigid base plate having an anchor portion and an article support portion extending laterally outwardly from said anchor portion;
   said anchor portion being configured for removably placing beneath a tire of a stationary vehicle for securely anchoring and sandwiching said anchor portion of said base plate between the vehicle tire and surface underlying the tire;
   an article support column having a bottom end portion and extending from said article support portion, said article support column is removably and arcuately adjustable secured to said article support portion of said base plate;
   said article support portion comprising;
   a generally hollow rectangular box structure having;
      a bottom defined by said article support portion of said base plate,
      at least three sides, and
      a top portion; and
   an article support column receptacle formed generally centrally through said box structure and comprising;
      four walls formed within said box structure, wherein one of said walls is sloped downward towards the wall on the corresponding opposite side for receiving the bottom end portion of said article support column,
      a closed bottom defined by said article support portion of said base plate, and
      an upper opening through said top of said box structure.

2. The vehicle anchored support according to claim 1, wherein said box structure includes a closable opening in at least one of said sides thereof.

3. The vehicle anchored support according to claim 1, wherein said article support column includes adjustable axial extension means.

4. The vehicle anchored support according to claim 1, wherein said article support column has a height configured for serving as a work station support, and includes attachment means for a work station extending outwardly therefrom.

5. The vehicle anchored support according to claim 4, including a work station removably secured to said article support column, with said work station including level adjusting means.

6. The vehicle anchored support according to claim 1, wherein said anchor portion of said base plate includes an upper surface and a lower surface, with traction enhancing means disposed upon at least said upper surface thereof.

7. The vehicle anchored support according to claim 1, wherein said anchor portion of said base plate includes a forward edge and a rearward edge, with each said edge including an upwardly extending wheel chock flange.

8. The vehicle anchored support according to claim 1, further including handle means.

9. The vehicle anchored support according to claim 1, wherein the bottom end portion of said article support column is rounded to allow the article support column to roll smoothly on the bottom of the article support column receptacle when angular adjustments are made to the article support column.

10. The vehicle anchored support according to claim 1, wherein said article support column includes attachment means for attaching an accessory extending therefrom; and
   wherein said accessory is at least one member selected from the group consisting of an umbrella, a hammock, a chair, a table and a lantern.

* * * * *